(12) United States Patent
Hietmann

(10) Patent No.: US 10,007,837 B2
(45) Date of Patent: Jun. 26, 2018

(54) DETERMINING THE ROBOT AXIS ANGLE AND SELECTION OF A ROBOT WITH THE AID OF A CAMERA

(71) Applicant: KUKA Roboter GmbH, Augsburg (DE)

(72) Inventor: Gerhard Hietmann, Herbertshofen (DE)

(73) Assignee: KUKA Roboter GmbH, Augsburg (DE)

( * ) Notice: Subject to any disclaimer, the term of this patent is extended or adjusted under 35 U.S.C. 154(b) by 56 days.

(21) Appl. No.: 15/163,395

(22) Filed: May 24, 2016

(65) Prior Publication Data

US 2016/0346927 A1    Dec. 1, 2016

(30) Foreign Application Priority Data

May 29, 2015   (DE) .......................... 10 2015 209 896

(51) Int. Cl.
*G06K 9/00* (2006.01)
*B25J 9/16* (2006.01)
(Continued)

(52) U.S. Cl.
CPC ........ *G06K 9/00201* (2013.01); *B25J 9/1656* (2013.01); *G06T 7/0004* (2013.01); *G06T 7/97* (2017.01); *H04N 13/0203* (2013.01); *G05B 2219/39448* (2013.01); *G05B 2219/39453* (2013.01); *G06K 2209/19* (2013.01); *G06T 2207/10012* (2013.01)

(58) Field of Classification Search
CPC .................. B25J 9/1656; B25J 9/1679; G05B 2219/39448; G05B 2219/39453; G05B 2219/40543
See application file for complete search history.

(56) References Cited

U.S. PATENT DOCUMENTS

| 6,167,464 A | 12/2000 | Kretschmann |
| 2004/0189631 A1* | 9/2004 | Kazi ...................... B25J 9/1671 345/418 |

(Continued)

FOREIGN PATENT DOCUMENTS

| DE | 102005061211 | 9/2006 |
| DE | 102012002657 | 8/2013 |

(Continued)

OTHER PUBLICATIONS

The extended European Search Report, dated Jul. 18, 2016, in the related European Patent Appl. No. 16171044.7.

(Continued)

*Primary Examiner* — Dale Moyer

(57) ABSTRACT

A method for identifying a manipulator by means of a portable terminal device, wherein the portable terminal device comprises a 3D camera. The method operates to detect a three-dimensional image of at least one part of the manipulator to be identified by means of the 3D camera of the portable terminal device. An actual status of the manipulator is determined based on the three-dimensional image detected. The 3D camera is a plenoptic camera, and the detected three-dimensional image comprises a four-dimensional light field of at least one part of the manipulator to be identified.

16 Claims, 3 Drawing Sheets

Figure 1:
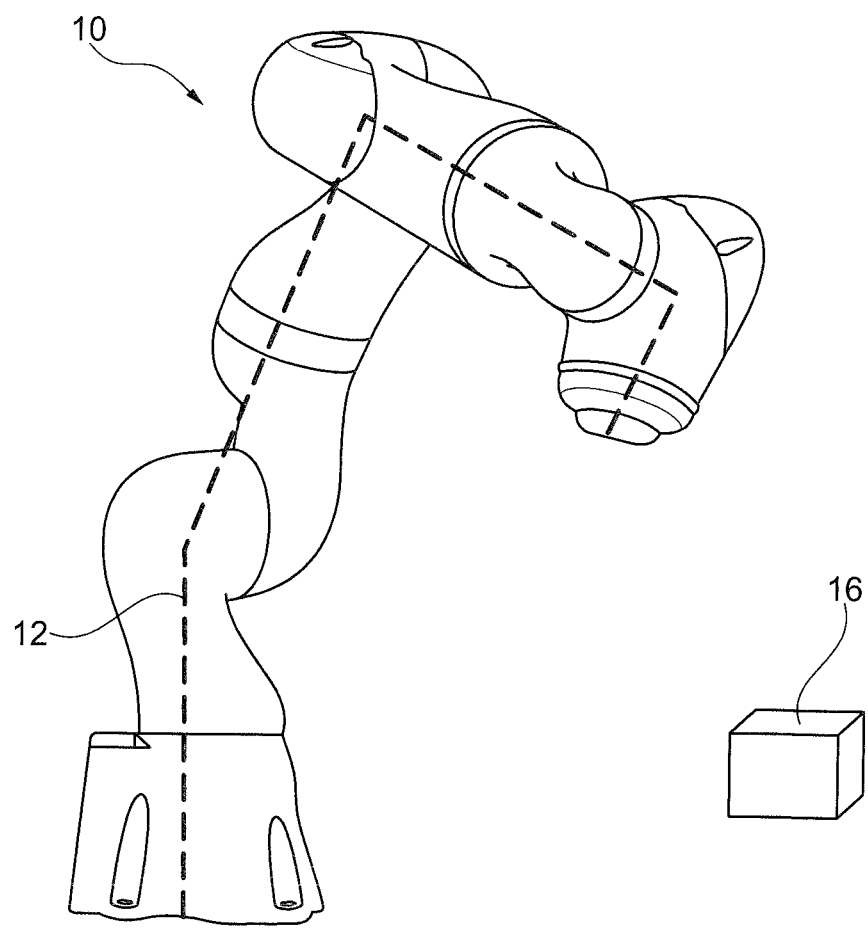

(51) Int. Cl.
*G06T 7/00* (2017.01)
*H04N 13/02* (2006.01)

(56) References Cited

U.S. PATENT DOCUMENTS

| | | | | |
|---|---|---|---|---|
| 2009/0055024 A1* | 2/2009 | Kay | ................. | B25J 9/1697 700/259 |
| 2009/0210090 A1 | 8/2009 | Takemitsu et al. | | |
| 2011/0311127 A1* | 12/2011 | Mizutani | ................. | B25J 9/1676 382/153 |
| 2012/0130539 A1* | 5/2012 | Kim | ................. | B25J 9/1689 700/248 |
| 2013/0116828 A1* | 5/2013 | Krause | ................. | B25J 9/1605 700/264 |

FOREIGN PATENT DOCUMENTS

| | | | | |
|---|---|---|---|---|
| EP | 1716983 | | 5/2008 | |
| EP | 3035242 A1 * | | 6/2016 | ......... G06K 9/00771 |
| JP | 2010131705 A * | | 6/2010 | ............ B25J 9/0084 |
| JP | 2011189431 A | | 9/2011 | |
| JP | 2012171024 | | 9/2012 | |
| WO | 2013126784 A2 | | 8/2013 | |

OTHER PUBLICATIONS

Kalman Bolla et al: "A fast image processing based robot identification method for Surveyor SRV-1 robots," Advanced Intelligent Mechatronics (AIM), 2011 IEEE/ASME International Conference On, IEEE, Jul. 3, 2011 (Jul. 3, 2011), pp. 1003-1009, XP032053609.

Miguel Contreras et al: "Robot Identification using Shape Features on an FPGA-Based Smart Camera," Image and Vision Computing New Zealand, ACM, 2 Penn Plaza, Suite 701 New York NY 10121-0701 USA, Nov. 19, 2014 (Nov. 19, 2014), pp. 282-287, XP058065351.

Gao: "Stereo vision matching for posture recognition of manipulator," Feb. 1, 2010 (Feb. 1, 2010), pp. 1-3, XP055286234, found via Internet: http://en.cnki.com.cn/Article_en/CJFDTOTAL-GXJM201002030.htm.

Examination Report from GPTO in DE Appl. No. 10 2015 209 896.6, dated Oct. 19, 2015.

The English translation of the Korean Office Action, dated Aug. 21, 2017, in the related Korean Patent Application No. 10-2016-0061565.

* cited by examiner

DETERMINING THE ROBOT AXIS ANGLE AND SELECTION OF A ROBOT WITH THE AID OF A CAMERA

This application claims the benefit of priority under 35 § 119(a) to German Patent Application No. 10 2015 209 896.6, filed on May 29, 2015.

1. TECHNICAL FIELD

The present invention relates to a method for identifying a manipulator by means of a portable terminal device, as well as a corresponding portable terminal device and a robotic system.

2. TECHNICAL BACKGROUND

Manipulators, and especially industrial robots, are automatically controlled, freely programmable, multi-purpose machines. They can be used for example in different areas of a manufacturing facility in order to process or measure a component or workpiece, for example, in a processing station or a measuring station. Several manipulators are normally deployed in spatial proximity to one another in an industrial environment, and they are able to carry out different, similar or the same tasks.

In modern industrial facilities with a certain degree of automation technology there is often a need to retrieve status information from a robotic system, for example in order to check current process parameters, isolate errors or even make program or parameter modifications. There may also be a need for example to retrieve status information from a specific robotic system at a specific point in time. For this purpose, the corresponding robot control system of the robotic system, which usually provides the status information, must first be identified and addressed. To this end, a user, for example, can manually enter a control system address or the like on an input device, which uniquely identifies the robot control system and potentially allows a triggering of the robot control system. This is disadvantageous, however, because the address must be known and entered. As a result, the method is relatively involved.

Making available special markings is known from another method, such as, for example, a QR code or an RFID tag, on a robotic system, and to read said markings as required and thereby identify the robotic system and the corresponding robot control system. However, this method is also associated with disadvantages, because said markings or tags must be attached to the relevant control system or mechanics. Furthermore, it is also possible that these markings might be temporarily obscured due to an unfavorable configuration, and therefore cannot be read. Consequently, the method is likewise relatively involved and, moreover, unreliable.

Therefore, one problem addressed by the present invention is making available a method, with which a manipulator or a robotic system can be identified simply and as error-free as possible. One problem in particular addressed by the present invention is making available a method with which a specific manipulator can be selected from a plurality of manipulators with the aid of a portable operating device. A further problem addressed by the present invention is eliminating at least partially the disadvantages described in the foregoing.

These and other problems, which will become evident when reading the following description, will be addressed by the subject matter of the main claims and additional claims.

3. CONTENT OF THE INVENTION

The present invention relates to a method for identifying a manipulator by means of a portable terminal device. Said portable terminal device can, for example, be a mobile consumer input device, such as, for example a tablet PC, a smart watch, a smart phone or the like, or even a mobile robotic operating device. The portable terminal device thereby comprises a 3D camera. The 3D camera is thereby preferably a plenoptic camera, which is based on the principle of light field sensors. These types of light field sensors consist of a field of micro lenses, and record the light and the color of the photographed object. Furthermore, the direction from which the light rays arrive is also detected. Light field sensors therefore allow, among other things, the focus of the image to change in retrospect, and 3D models of a copied object can be created.

The method according to the invention features a detection of a three-dimensional image of at least one part of the manipulator to be identified by means of the 3D camera of the portable terminal device. The entire manipulator to be identified is thereby preferably detected by means of the 3D camera. An actual status of the manipulator is determined based on the three-dimensional image detected. Furthermore, reference statuses of the manipulator are made available by the method according to the invention, and the manipulator is identified based on the actual status determined and the actual reference statuses made available.

An actual status or a reference status thereby preferably describes a configuration of a manipulator. A status of a manipulator preferably comprises information about at least one of the following: a pose of the manipulator, an axis angle of the manipulator, a position of the manipulator, an orientation of the manipulator, or a temporal change of one of these values. Furthermore, the status of a manipulator can also comprise information about absolute sizes (or dimensions) and/or actual proportions of individual components of the manipulator. Said components can thereby comprise, for example, a manipulator arm or a gripper. Based on the status of a manipulator, said manipulator can be differentiated advantageously from other manipulators, because every manipulator is normally distinguished by its own individual status.

It is therefore possible to select or identify a manipulator in an intuitive manner by means of the method according to the invention. No markers, markings or tags are required, rather a status of the manipulator is determined based on a three-dimensional image detected. The manipulator can be advantageously identified uniquely and automatically based on said determined status and the reference statuses made available. The use of the 3D camera also allows a manipulator to be identified from a greater distance, for example if the user of the portable terminal device is spatially separated from the manipulator due to a safety fence. Thus, it is possible for the user to be at a safe distance from the manipulator and, despite this, identify said manipulator. Furthermore, because of the use of a 3D camera, only one image of the manipulator to be identified (or of one part of said manipulator) must be detected, because the detected three-dimensional image contains sufficient information to permit a clear recognition of the manipulator.

The making available of reference statuses preferably takes place by a manipulator control system (robot control system). The reference statuses can thereby comprise the reference statuses of a plurality of manipulators, one of which is the manipulator to be identified. For example, the manipulator control system cyclically communicates the axis angles of one or more kinematics or manipulators connected thereto. Therefore, the detection of the three-dimensional image, the determination of the actual status of the manipulator and the identification of the manipulator are carried out by the portable terminal device. The portable terminal device thereby preferably receives the reference statuses of all manipulator control systems transmitting in its reception range, and executes the step of identifying the manipulator based, among other things, on said received reference statuses. Thus, all relevant manipulators in one room, for example, are taken into consideration by the method according to the invention, in order to establish which one is the manipulator to be identified.

The reference statuses are preferably made available wirelessly. The portable terminal device is therefore set up for a mobile use, and can be transported without a problem from one station to another in a factory hall, for example, and communicate directly with the relevant manipulator control systems. Consequently, a user is able to identify desired manipulators simply and intuitively without great effort, and subsequently check status information of the identified manipulator, for example.

The identification of the manipulator preferably comprises a determination of whether the determined actual status of the manipulator conforms to at least one of the reference statuses of the manipulator made available. Thus, for example, all reference statuses that are made available are compared to the actual status of the manipulator determined in order to establish whether and which of the reference statuses of the manipulator that were made available conform to the actual status determined. If such a conformity is determined or established, the relevant manipulator can preferably be identified immediately, because the origin and circumstances of the conforming reference status that was made available are advantageously known (for example, based on time stamps, etc.).

The identification of the manipulator preferably comprises a selection of one of the reference statuses made available so that the selected reference status was established at approximately the same time as the detection of the three-dimensional image. Thus, a reference status is selected which describes a status of the manipulator at approximately the time at which the three-dimensional image of the manipulator was detected. If reference statuses of a plurality of manipulators were made available, the possible selection can therefore be restricted, for example, to the effect that only those reference statuses that were generated at approximately the time at which the three-dimensional image was detected are used for identifying the manipulator. To this end, for example, time stamps of the reference statuses can be used, or the reference statuses made available at the time that the three-dimensional image was detected can be appropriately designated so that said reference statuses are used for identifying the manipulator. Because a perfect, time-related conformity is rarely the case due to technical conditions, an appropriate tolerance can also be used, for example.

The identification of the manipulator preferably comprises a selection of one of the reference statuses of the manipulator made available so that the selected reference status is nearest to the actual status of the manipulator determined. Thus, for example, a comparison is made of which of all of the statuses made available, which could describe a plurality of manipulators in a factory hall for example, is most likely to apply to the manipulator, which is supposed to be identified (and was imaged at least partially by means of the 3D camera). For this purpose, a predefined tolerance value can also preferably be used, and the selection of one of the reference statuses made available takes place such that a difference between the selected reference status and the actual status determined is less than a predefined tolerance value. Therefore, it is possible to select a matching reference status as accurately as possible and nevertheless with a high degree of precision and efficiently identify the relevant manipulator.

The selection of one of the reference statuses made available preferably takes place by a stationary computer or processor, such as, for example, by a central computer or a host computer. In the process, in particular preferably the reference statuses are made available to the computer by a manipulator control system or robot control system. The computer can be integrated into a network for example by cable or wirelessly, and be used, for example, for program archival, software updates, collecting production information or the like. Furthermore, the portable terminal device preferably makes the detected three-dimensional image and/or the determined actual status of the manipulator available to the computer. Then, where appropriate, the step of detecting the actual status of the manipulator preferably takes place by the central computer, along with the selection of one of the reference statuses made available according to the present invention.

The determination of an actual status of the manipulator preferably takes place as described by the portable terminal device or a stationary computer, which is installed in an immovable manner. Depending on the computing power of the portable terminal device, the workload can therefore be effectively distributed between the portable terminal device and the stationary computer.

The actual status of the manipulator preferably comprises information about at least one of the following: actual pose of the manipulator, actual axis angle of the manipulator, actual position of the actual manipulator, actual orientation of the manipulator, actual Cartesian position of a tool center point of the manipulator, or a temporal change of the cited values, or actual sizes and/or actual proportions of individual components of the manipulator. The actual status of the manipulator can be obtained from the detected three-dimensional image. Accordingly, the reference statuses of the manipulator preferably comprise information about at least one of the following: reference poses of the manipulator, reference axis angles of the manipulator, reference positions of the manipulator, reference orientations of the manipulator, reference Cartesian positions of a tool center point of the manipulator or temporal changes of the cited values, or reference sizes and/or reference proportions of individual components of the manipulator. Correspondingly, a unique correlation, as much as possible, can be identified between the manipulator to be identified and the known manipulators.

The 3D camera is preferably a plenoptic camera, and the detection of a three-dimensional image comprises a detection of a four-dimensional light field of the at least one part of the manipulator to be identified. Therefore, for example, axis angles of a robot or a manipulator, or generally a status of the manipulator, can be determined with a high level of accuracy.

The portable terminal device preferably comprises a display part, which depicts the detected image. Therefore, a user of the portable terminal device can immediately recognize whether a matching image of the manipulator to be identified was detected or not. As a result, an erroneous identification by detecting an image a manipulator that is not to be identified can be prevented.

Furthermore, the present invention relates to a portable terminal device, which comprises a 3D camera and a device control, wherein the device control is set up to determine the actual status of the axis angles of the manipulator from a detected image of a manipulator and wherein the device control is preferably further set up to carry out a method according to the invention for identifying a manipulator. Because complex control panels are not required to identify a manipulator, it is possible for the portable terminal device to be a small size and therefore be suitable for a mobile and comfortable use.

The present invention moreover relates to a robotic system, comprising a manipulator and a portable terminal device, which terminal device comprises a 3D camera. Furthermore, the robotic system thereby has a control system, which is set up to carry out a method according to the invention for identifying a manipulator. The 3D camera of the portable terminal device is preferably a plenoptic camera.

4. EXEMPLARY EMBODIMENTS

Figure 2:
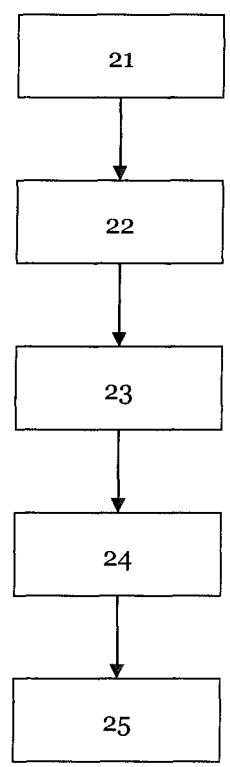
Figure 3:
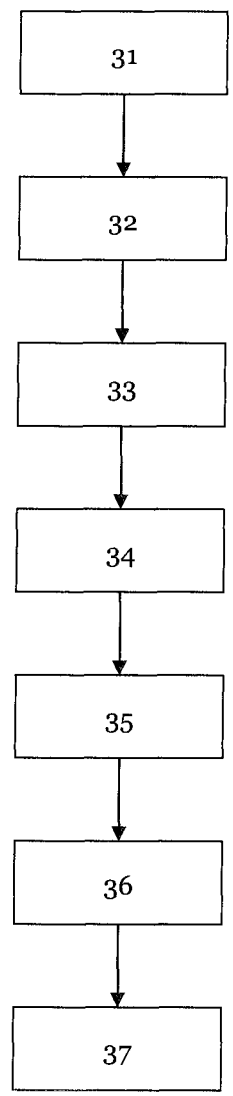

The present invention will be described in greater detail in the following making reference to the enclosed drawings, which show:

FIG. 1 An example of a manipulator to be identified;

FIG. 2 The sequence of a method according to the invention for identifying a manipulator, and FIG. 3 The sequence of another method according to the invention for identifying a manipulator.

FIG. 1 shows an example of a manipulator 10, which is configured as a multi-axle jointed-arm robot. The depicted manipulator 10 is located, for example, in a factory hall together with other manipulators (not shown), and is supposed to be identified and addressed from the plurality of said manipulators by means of a portable terminal device 16.

The portable terminal device 16 thereby comprises a 3D camera (not shown), which is a plenoptic camera and is based on the principle of light field sensors. To identify the manipulator 10, a three-dimensional image is recorded with the portable terminal device 16, and based on the image detected, a simple three-dimensional line model 12 of the manipulator is determined, as depicted in FIG. 1 by the dashed line. Based on said three-dimensional line model 12, axis angles or a pose of the manipulator for example can be detected or calculated.

FIG. 2 schematically shows a sequence of a method for identifying a manipulator, which is described in the following making reference to the configuration depicted in FIG. 1 In Step 21, every manipulator control system of the plurality of manipulators, in e.g., a factory hall, cyclically communicates the axis angles of the manipulators attached thereto (and/or other object information, such as e.g., the current Cartesian positions of the tool center points, tool volume model, environmental models, etc.), of, among other things, the manipulator 10 to be identified, via radio. The portable terminal device 16 receives the information (reference values) of all manipulator control systems transmitting in its reception range.

In Step 22, the camera of the portable terminal device 16 is aimed at the manipulator 10, and an image of said manipulator 10 is recorded. Based on a model of the manipulator 10 that was previously made available, all actual axis angles of the manipulator 10 are determined on the basis of the 3D image data.

In Step 23, the portable terminal device 16 selects the information received in Step 21 in the respect that only that information which describes for example the axis angles of the manipulators at the point in time that the image was recorded is used. Then, the portable terminal device 16 compares said information with the actual axis angles determined (and/or other object information).

In Step 24, in the event of conformity, the desired manipulator control system is identified. Thus, a correlation is made between the actual axis angle obtained from the image data and all axis angles made available (reference axis angles) so that the imaged manipulator can be uniquely identified.

Then in Step 25 the portable terminal device can establish a connection with the identified manipulator or identified control system, and interact with said manipulator or control system. For example, statuses can be read, parameters can be set, or messages can be displayed and/or acknowledged.

FIG. 3 schematically shows the sequence of another method according to the invention for identifying a manipulator, such as, e.g., for identifying the manipulator 10 from FIG. 1. The method begins at Step 31, during which step all manipulator control systems establish a network connection with a central computer (stationary computer).

In Step 32, all these manipulator control systems communicate their current axis angles (and/or other object information) to the central computer. This preferably takes place cyclically, for example for each interpolation cycle (IPO cycle).

In Step 33, a three-dimensional image of a manipulator 10 to be identified is recorded by means of the 3D camera of the portable terminal device 16. Said image contains three-dimensional information, which makes possible, for example, a preparation of a three-dimensional model of the manipulator 10 to be identified.

In Step 34, the recorded image is made available to the central computer, and the robot or manipulator axis angles are determined by the central computer based on the image made available. Alternatively, the axis angles can also be determined in the portable terminal device and then be made available to the central computer.

In Step 35, the central computer compares the actual axis values determined from the image with the reference axis angles supplied by the manipulator control systems in Step 32. For this purpose, tolerances can be taken into consideration in order to make an efficient comparison possible.

In Step 36, in the case of conformity, the desired control system is identified and a message is transmitted to the portable terminal device 16, which allows said terminal device to establish a connection with the identified control system. For example, the corresponding address of the control system can be made available to the portable terminal device 16 so that the portable terminal device 16 can automatically establish a connection to said control system.

In Step 37, the portable terminal device interacts with the identified control system, wherein, for example, requests for status information or the like are transmitted.

In order to further increase the accuracy or precision of the comparison, in addition to or as an alternative to considering the axis angles, volume models can also be used, for example of the tool used, the end effector, a component in the proximity of the manipulator, an environmental model of the robot or the manipulator itself, etc.

Instead of a detected three-dimensional image, a plurality of three-dimensional images and/or a three-dimensional video recording of the manipulator to be identified can also be used. For example, several images can be recorded from various lines of sight. Furthermore, a dynamic image recording and processing can also be carried out, for example. Therefore, this makes a more secure manipulator identification possible, because now dynamic data from the image can be compared to the dynamic data of manipulator control systems, such as, for example, a contour of the tool center point in the room, axis-specific or Cartesian speeds, and the like.

It should be noted that the invention claimed herein is not limited to the described embodiments, but may be otherwise variously embodied within the scope of the claims listed infra.

LIST OF REFERENCE SIGNS

10 Manipulator
12 Three-dimensional line model
16 Portable terminal device

The invention claimed is:

1. A method for identifying one of a plurality of manipulators by means of a portable terminal device, wherein the portable terminal device comprises a 3D camera, the method having the following steps:
   a) detecting a three-dimensional image of at least one part of the manipulator to be identified by means of the 3D camera of the portable terminal device;
   b) determining an actual status of the manipulator to be identified based on the three-dimensional image detected;
   c) making available reference statuses for each, of the plurality of manipulators, wherein each of the plurality of manipulators is distinguishable by its own reference status, and
   d) identifying the manipulator to be identified from the plurality of manipulators based on a comparison of the actual status determined to each of the reference statuses made available.

2. The method according to claim 1, wherein a manipulator control system performs the step of making the reference statuses available.

3. The method according to claim 1, wherein the reference statuses are made available wirelessly.

4. The method according to claim 1, wherein the identification of the manipulator to be identified comprises the step of determining that the determined actual status of the manipulator to be identified conforms to at least one of the reference statuses.

5. The method according to claim 1, wherein the identification of the manipulator to be identified comprises the step of selecting one of the reference statuses that was established at approximately the same time that the three-dimensional image was detected.

6. The method according to claim 1, wherein the identification of the manipulator to be identified comprises the step of selecting one of the reference statuses that is nearest to the actual status of the manipulator determined.

7. The method according to claim 6, wherein the selection of the nearest reference status includes the step of determining that a difference between the selected reference status and the actual status determined is less than a predefined tolerance value.

8. The method according to claim 5, wherein the selection of one of the reference statuses made available takes place by a stationary computer.

9. The method according to claim 1, wherein the determination of an actual status of the manipulator takes place by the portable terminal device or a stationary computer.

10. The method according to claim 1, wherein the actual status of the manipulator comprises information representing at least one characteristic selected from the group consisting of:
   an actual pose of the manipulator,
   an actual axis angle of the manipulator,
   an actual position of the manipulator,
   an actual orientation of the manipulator,
   an actual Cartesian position of a tool center point of the manipulator,
   a temporal change of an actual pose of the manipulator,
   a temporal change of an actual axis angle of the manipulator,
   a temporal change of an actual position of the manipulator,
   a temporal change of an actual orientation of the manipulator,
   a temporal change of an actual Cartesian position of a tool center point of the manipulator,
   actual sizes of individual components of the manipulator, and
   actual proportions of individual components of the manipulator.

11. The method according to claim 1, wherein the reference statuses of the manipulator comprise information representing at least one characteristic selected from the group consisting of an:
   reference poses of the manipulator,
   reference axis angles of the manipulator,
   reference positions of the manipulator,
   reference orientations of the manipulator,
   reference Cartesian position of a tool center point of the manipulator,
   temporal changes of a reference pose of the manipulator,
   temporal changes of a reference axis angle of the manipulator,
   temporal changes of a reference position of the manipulator,
   temporal changes of a reference orientation of the manipulator,
   temporal changes of a reference Cartesian position of a tool center point of the manipulator,
   reference sizes of individual components of the manipulator, and
   reference proportions of individual components of the manipulator.

12. The method according to claim 1, wherein the 3D camera is a plenoptic camera, and wherein the detection of the throe-dimensional image comprises a detection of a four-dimensional light field of the at least one part of the manipulator to be identified by means of the plenoptic camera.

13. A portable terminal device, comprising:
   a 3D camera; and
   a device control,
   wherein the 3D camera is configured to prepare a 3D image of one of a plurality of manipulators to be identified, and
   wherein the device control is configured to:
      determine an actual status of the manipulator to be identified on the three-dimensional image detected;
      make available reference statuses for each of the plurality of manipulators, wherein each of the plurality of manipulators is distinguishable by its own reference status, and identify the manipulator to be identified based on a comparison of the actual status determined for each of the reference statuses made available.

14. A robotic system, comprising:
a plurality of manipulators; and
a portable terminal device which comprises a 3D camera and a control system,
wherein the control system is configured to:
 detect a three-dimensional image of at least one part of one of the manipulators to be identified by means of the 3D camera of the portable terminal device;
 determine an actual status of the manipulator to be identified based on the three-dimensional image detected;
 make available reference statuses for each of the manipulators, wherein each of the manipulators is distinguishable by its own reference status, and
identify the manipulator to be identified based on a comparison of the actual status determined to each of the reference statuses made available.

15. The portable terminal device according to claim 13, wherein the 3D camera is a plenoptic camera.

16. The robotic system according to claim 14, wherein the 3D camera is a plenoptic camera.

\* \* \* \* \*